(12) United States Patent
Bauer et al.

(10) Patent No.: US 7,408,884 B2
(45) Date of Patent: Aug. 5, 2008

(54) METHODS AND DEVICES FOR CORRELATING AUDIO SAMPLE COMPARISONS AND NETWORK PERFORMANCE STATISTICS

(75) Inventors: Samuel M. Bauer, Colorado Springs, CO (US); James P. Quan, Colorado Springs, CO (US)

(73) Assignee: Agilent Technologies, Inc., Santa Clara, CA (US)

( * ) Notice: Subject to any disclaimer, the term of this patent is extended or adjusted under 35 U.S.C. 154(b) by 1019 days.

(21) Appl. No.: 10/401,010

(22) Filed: Mar. 26, 2003

(65) Prior Publication Data

US 2005/0261895 A1    Nov. 24, 2005

(51) Int. Cl.
*H04L 12/26* (2006.01)
*H04L 12/66* (2006.01)
(52) U.S. Cl. ........................................ 370/252; 370/352
(58) Field of Classification Search ........................ None
See application file for complete search history.

(56) References Cited

U.S. PATENT DOCUMENTS

| | | | |
|---|---|---|---|
| 6,700,953 B1 * | 3/2004 | Maurer et al. | 379/88.01 |
| 6,741,569 B1 * | 5/2004 | Clark | 370/252 |
| 6,748,433 B1 * | 6/2004 | Yaakov | 709/224 |
| 6,807,156 B1 * | 10/2004 | Veres et al. | 370/252 |
| 6,823,302 B1 * | 11/2004 | Atkinson et al. | 704/216 |
| 7,075,981 B1 * | 7/2006 | Clark | 375/224 |
| 2004/0071084 A1 * | 4/2004 | El-Hennawey et al. | 370/230 |

* cited by examiner

*Primary Examiner*—Chi H. Pham
*Assistant Examiner*—Soon-Dong D Hyun

(57) ABSTRACT

Methods and devices for evaluating audio quality in a network are described. First and second audio samples are compared. The first audio sample includes a reference signal that is transmitted through a path on the network. The second audio sample includes the reference signal after it has traveled the path and is received. In addition, network performance while the reference signal travels the path is monitored. The results of the comparison are correlated with network performance statistics derived from the monitoring.

16 Claims, 3 Drawing Sheets

METHODS AND DEVICES FOR CORRELATING AUDIO SAMPLE COMPARISONS AND NETWORK PERFORMANCE STATISTICS

BACKGROUND

Embodiments of the invention generally relate to the delivery of audio information over a network. More specifically, embodiments of the invention pertain to monitoring and evaluating the delivery of audio information over a network.

Traditionally, digital voice communication has relied primarily on circuit-switched networks. However, packet-switched networks (e.g., the Internet) are being increasingly used for voice communications. The adoption of packet-switched networks for voice communication has engendered a requirement for testing the capability of the packet-switched network to handle the unique requirements of voice transmission. Generally, this testing is referred to as Voice Quality Testing (VQT).

In general, there are a number of factors involved in determining voice quality. Some of these factors can be objectively measured, while others of these factors are more subjective in nature and hence more difficult to quantify. An example of the former is packet delay, and an example of the latter is clarity.

Internet-standard protocols such Real-Time Transport Protocol (RTP) and Real-Time Control Protocol (RTCP) provide the capability for measurement of the more objective factors. Examples of industry-standard techniques for measurement of the more subjective factors include Perceptual Speech Quality Measurement (PSQM), Perceptual Analysis/Measurement System (PAMS), and Perceptual Evaluation of Speech Quality (PESQ).

A problem with conventional voice quality testing is that the different types of information available for evaluating audio (e.g., voice) quality in a network are disparate and incoherent, making it difficult to assess network capability and to identify the causes of any degradation in performance.

SUMMARY

Embodiments of the invention pertain to methods and devices for evaluating audio (e.g., voice) quality in a network. In one embodiment, first and second audio samples are compared. The first audio sample includes a reference signal that is transmitted through a path on the network. The second audio sample includes the reference signal after it has traveled the path and is received. In addition to the sample comparison, network performance is monitored while the reference signal travels the path. The results of the comparison are correlated with network performance statistics derived from the monitoring. In one such embodiment, the comparison results and the network performance statistics are displayed as a function of time in a user-friendly graphical user interface that can also include tabulated data.

The correlation of the comparison and monitoring information, along with the user-friendly display of that information, allows a user to focus on areas where the audio (voice audio) has been transformed as it traversed the network path. The presentation of network performance statistics concurrently with graphical displays of, for example, the reference signal and the received signal permit the user to more readily identify any degradation in quality as well as its cause. For instance, the effect of network performance (e.g., dropped packets, jitter, etc.) on audio clarity is directly observable.

BRIEF DESCRIPTION OF THE DRAWINGS

The accompanying drawings, which are incorporated in and form a part of this specification, illustrate embodiments of the invention and, together with the description, serve to explain the principles of the invention. The drawings referred to in this description should not be understood as being drawn to scale except if specifically noted.

DETAILED DESCRIPTION OF THE INVENTION

Reference will now be made in detail to the various embodiments in accordance with the invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. In other instances, well-known methods, procedures, components, and circuits have not been described in detail as not to unnecessarily obscure aspects of the present invention.

Figure 1:
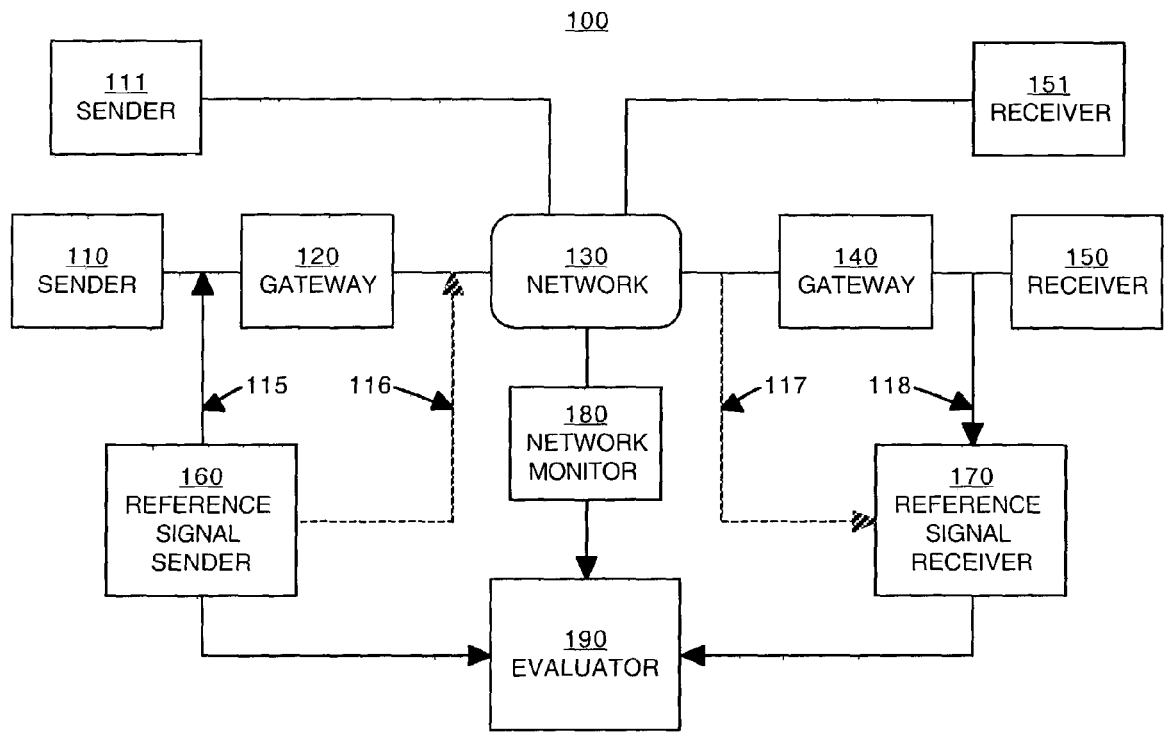
FIG. 1 is a functional block diagram of a system for evaluating audio quality according to one embodiment of the present invention.

FIG. 1 is a functional block diagram of a system 100 for evaluating audio (e.g., voice) quality according to one embodiment of the present invention. In the embodiment of FIG. 1, system 100 includes sender 110 and 111, a gateway 120, a network 130, another gateway 140, and receiver 150 and 151. The system 100 also includes a reference signal source 160, a reference signal receiver 170, a network monitor 180, and an evaluator 190.

It is understood that these functional blocks can be known by many other names. Furthermore, although the embodiment illustrated by FIG. 1 includes a number of functional blocks illustrated as separate elements, it is appreciated that the functionality provided by any of these elements can be combined and/or integrated with the functionality of one or more of the other elements. For example, a single test instrument can include a reference signal source 160, a reference signal receiver 170, a network monitor 180, and an evaluator 190. It is further appreciated that the system 100 can include additional elements not shown or described herein, and that the elements shown by FIG. 1 can implement additional functions not described herein. What is significant is the functionality provided by system 100, and not necessarily how that functionality is delegated to the various elements illustrated in FIG. 1.

In the embodiment of FIG. 1, senders 110 and 111 are used for initiating and conducting calls over the system 100 to receivers 150 and 151. For example, sender 110 can be embodied as a conventional analog telephone, and sender 111 can be embodied as a telephone suitable for Internet telephony, which is often referred to as Internet Protocol (IP) telephony, Voice over the Internet (VOI), or Voice over IP (VoIP). Sender 110 is typically coupled by a circuit-switched line (or network) to gateway 120, which in turn is coupled by packet-switched network 130 (e.g., the Internet) to gateway 140, while sender 111 is typically coupled directly to the packet-switched network 130. Similarly, receiver 150 can be embodied as a conventional analog phone that is coupled to gateway 140 by a circuit-switched line (or network), while receiver 151 can be embodied as a telephone suitable for Internet telephony that is coupled directly to network 130.

As one mechanism for evaluating audio (voice) quality, a reference signal sender 160 is coupled to gateway 120, and a reference signal receiver 170 is coupled to gateway 140. Reference signal sender 160 produces an acoustic or electronic analog signal (e.g., voice or voice equivalent). This reference signal undergoes analog-to-digital conversion, and is perhaps also subject to encryption, compression (encoding), and other digital signal processing. The reference signal is sent along a path through the network 130 and is received by reference signal receiver 170. On the receiving end, the received signal can undergo processing such as digital-to-analog conversion, de-encryption, decompression, and the like.

The reference signals can be sent over the network 130 either upstream or downstream of gateway 120, as exemplified by the paths 115 and 116, respectively. On the receiving end, the signal can be received either upstream or downstream of gateway 140, as exemplified by paths 117 and 118, respectively.

Evaluator 190 can then compare the signal received at receiver 170 to the reference signal input using sender 160. This comparison can be performed in real time, as the reference signal is received. Alternatively, reference signal information (the sent and/or the received signal) can be recorded and post-processed. It is appreciated that evaluator 190 can function as a remote test server, generating the reference signal and recording the received signal as well as comparing the reference and received signals.

As one example of an alternate test approach, a looped back call is used as follows. The reference signal is sent from a sender over the network to a receiver. The receiver loops the received signal back over the network to the original source of the reference signal (the sender). The looped back signal is then evaluated. The looped back signal has traversed the network twice, and will potentially experience any effects of traveling over the network to a greater degree than a signal that has traveled only once over the network.

Other test configurations and methods are possible. Again, what is significant is the functionality provided, rather than the manner in which that functionality is delegated.

Techniques used by evaluator 190 include, but are not limited to, Perceptual Speech Quality Measurement (PSQM), Perceptual Analysis/Measurement System (PAMS), and Perceptual Evaluation of Speech Quality (PESQ). These techniques can be used to calculate scores that provide relative measures of audio quality and clarity. The scores can be calculated as a function of time for the duration of the reference signal. In one embodiment, each score is time-stamped as it is computed. The scores are also correlated to the particular call path (e.g., channel and/or port) over which the reference signal was sent.

The mechanism just described is referred to herein as an "active" approach or an active test. Another mechanism for evaluating audio (voice) quality is referred to herein as a "passive" approach. According to this latter approach, network monitor 180 is inserted into network 130 at a point at which it can monitor the network path between reference signal sender 160 and receiver 170. During the time period in which the reference signal is traversing the network path between reference signal sender 160 and receiver 170, network monitor 180 is passively capturing network performance information.

Internet-standard protocols such Real-Time Transport Protocol (RTP) and Real-Time Control Protocol (RTCP) provide the capability for capturing network performance information. The type of information captured generally pertains to the events or incidents in the audio stream that could have an impact on voice quality. The information is collected over the duration of the call; that is, for example, over the duration of an active test. Based on the monitored information, other information (e.g., performance statistics) can be derived. The statistics and events can be computed and presented either in real-time or post-processed.

The type of events and statistics that are collected include, but are not limited to: lost packet events, early arrival packet events, late arrival packet events, jitter statistics, vocoder change events, codec change events, silence packet events, and jitter buffer depth. In one embodiment, the information is time-stamped so that it can be time-correlated to a recorded Pulse Code Modulation (PCM) file. In addition, the call port or channel that this information is captured on can also be recorded along with the information.

Lost, early, and late packet events are asynchronous, generated only when they occur. These types of events indicate that a packet was either lost (e.g., never received), or received too early or too late to be used. Vocoder/codec change events are also asynchronous, and indicate that some characteristic of the vocoder/codec in use has been changed, such as the vocoding or codec algorithm, the bit rate, or the packet size.

Jitter events/statistics are more regular and can be kept for each audio packet that is received. An audio packet typically contains about 20 to 30 milliseconds of encoded voice, although packets can be much larger. In one embodiment, jitter is measured to a minimum resolution of one millisecond.

Silence packet events are used by those vocoders capable of sending and receiving silence packets (e.g., silence insertion descriptor packets). Silence packets are also asynchronous.

A jitter buffer can be of fixed depth (size), or its depth can be dynamically adjusted. The initial jitter buffer depth information can be recorded, with additional records being generated each time there is a change to the jitter buffer depth.

Figure 2:
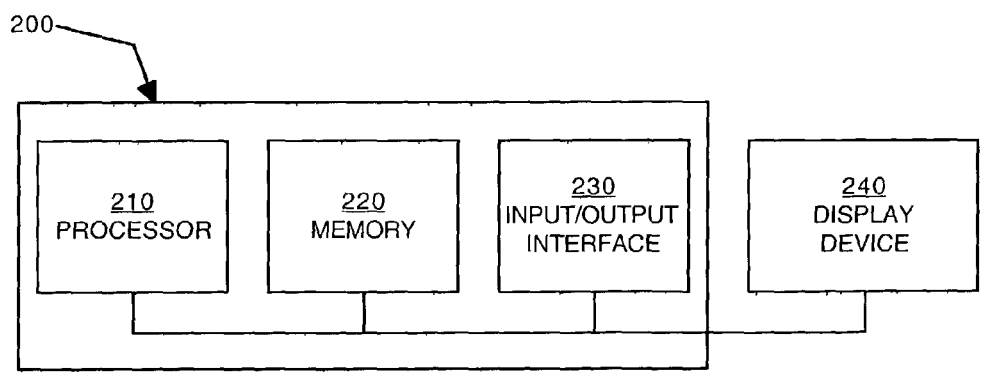
FIG. 2 is a functional block diagram of a device for evaluating audio quality according to one embodiment of the present invention.

FIG. 2 is a functional block diagram of a device 200 for evaluating audio quality according to one embodiment of the present invention. In one embodiment, device 200 is embodied as a printed circuit board that can be incorporated into a computer system or similar type of device. For example, device 200 can be incorporated into evaluator 190 of FIG. 1.

It is appreciated that device 200 can include elements other than those illustrated in FIG. 2. For example, device 200 can include digital signal processors, multiple memories (e.g., random access memory and read-only memory), etc.

In the present embodiment, device 200 includes a processor 210, a memory 220, and an input/output interface 230. The input/output interface 230 is for providing a physical interface to a system or network under test (e.g., system 100 of FIG. 1). Thus, input/output interface 230 can be used to receive event information collected using the passive (e.g., monitoring) approach described above, and/or it can also be used to send and/or receive reference signals during an active test.

In the present embodiment, device 200 is coupled to a display device 240. Display device 240 can be a liquid crystal device, cathode ray tube, or other display device suitable for creating graphic images and alphanumeric characters recognizable to the user.

Figure 3:
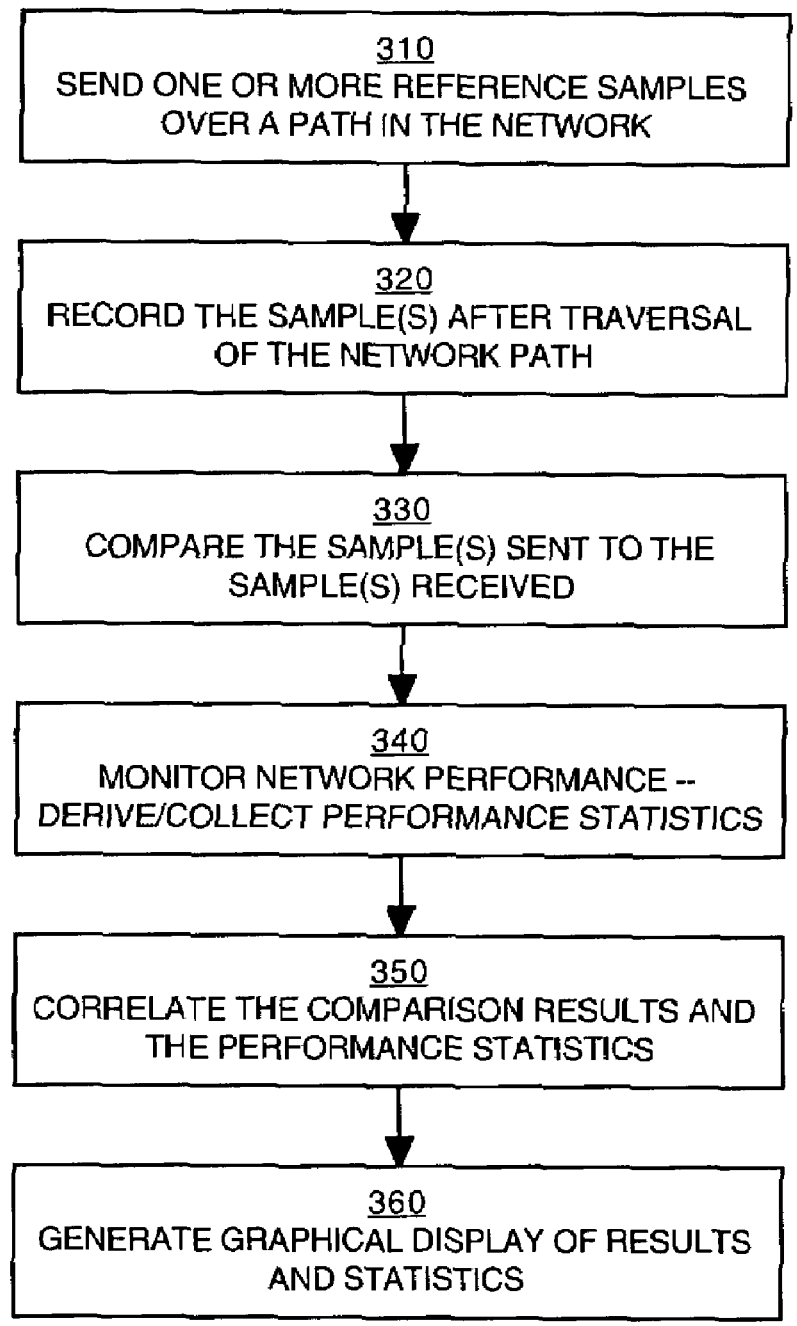
FIG. 3 is a flowchart of a method for evaluating audio quality according to one embodiment of the present invention.

FIG. 3 is a flowchart 300 of a method for evaluating audio quality according to one embodiment of the present invention. Although specific steps are disclosed in flowchart 300, such steps are exemplary. That is, embodiments of the present invention are well suited to performing various other steps or variations of the steps recited in flowchart 300. It is appreciated that the steps in flowchart 300 can be performed in an order different than presented, and that not all of the steps in flowchart 300 may be performed. In one embodiment, the method of flowchart 300 is implemented by a device such as device 200 of FIG. 2. The method of flowchart 300 can be implemented in real time or by post-processing.

In step 310 of FIG. 3, one or more reference audio samples are sent over a path in a network. For example, referring to FIG. 1, a reference signal is sent from reference signal sender 160 on a call path (e.g., channel) through network 130 to reference signal receiver 170. The reference signal is also available to evaluator 190.

In step 320 of FIG. 3, the audio sample(s) are recorded after they have traversed the network path. Referring to FIG. 1, the audio sample(s) that are received at reference signal receiver 170 are also available to evaluator 190.

In step 330 of FIG. 3, the reference audio sample(s) sent over the network path are compared to the respective sample(s) received after traversing the network path. In one embodiment, this comparison is performed by evaluator 190 of FIG. 1. Techniques that can be used for the comparison include PSQM, PAMS, and PESQ. These techniques can be used to calculate scores that provide relative measures of audio quality and clarity, for example. It is recognized that the audio sample(s) have the dimension of time. Accordingly, the comparison scores can be calculated as a function of time. In one embodiment, each score is time-stamped as it is computed. The scores can also be indexed to the channel or port (path) over which the reference sample(s) were sent.

In step 340 of FIG. 3, network performance over the period of time during which the reference sample(s) were sent is also monitored. In one embodiment, this information is monitored and collected according to Internet-standard protocols such as RTP and RTCP. Information collected during the monitoring can be time-stamped and also indexed to the channel or port (path) from which it was collected. In addition, information (e.g., network performance statistics) can be derived from the information collected. The network performance statistics can be time-stamped, as well as indexed to the relevant channel.

In step 350, according to the embodiments of the present invention, the comparison results (from step 330) and the performance statistics (from step 340) are correlated. In one embodiment, the correlation is performed using the time stamps and the channel identifiers.

In step 360, according to the embodiments of the present invention, the comparison results and the performance statistics are presented using a user-friendly graphical user interface (e.g., on display device 240 of FIG. 2). Thus, according to the embodiments of the present invention, the comparison results and the network performance information are pulled together, synchronized in time, and displayed together in a graphical display. The correlation of the comparison and monitoring information allows the user to focus on areas where the audio (voice audio) has been transformed as it traversed the network path. The presentation of network performance statistics concurrently with graphical displays of, for example, the reference signal and the received signal permit the, user to more readily identify any degradation in quality as well as its cause. For instance, the effect of network performance (e.g., dropped packets, jitter, etc.) on audio clarity is directly observable.

Figure 4:
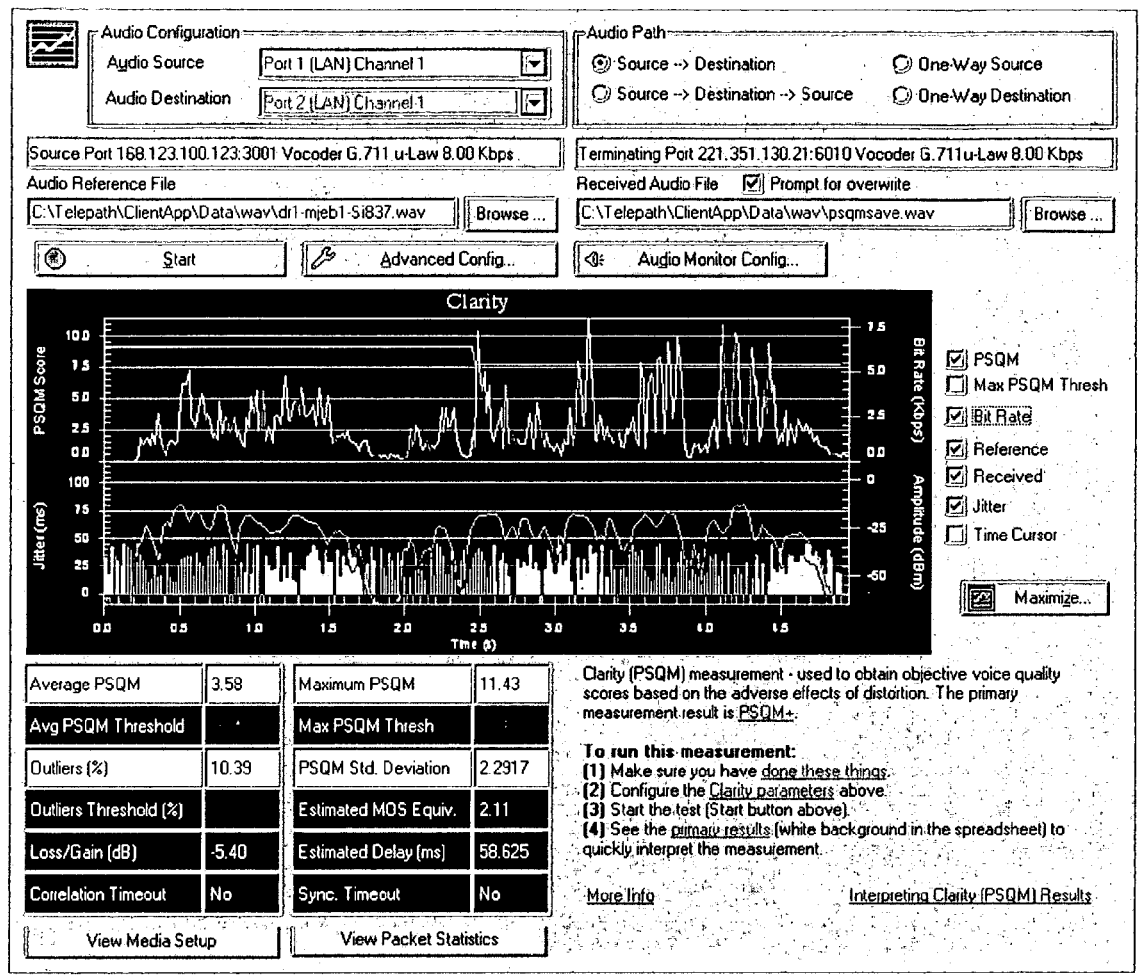
FIG. 4 is an exemplary graphical user interface according to one embodiment of the present invention.

FIG. 4 is an exemplary graphical user interface (GUI) 400 according to one embodiment of the present invention. GUI 400 provides the comparison results and the network performance statistics (refer to FIGS. 2 and 3) in a correlated fashion.

In the example of FIG. 4, the audio source and audio destination ports are selected and displayed using drop-down menus. The drop-down menus include those channels or ports experiencing an active call or answer state.

The type of audio path (e.g., source to destination) selected is also indicated. The transport address for the audio source (source port) and the audio termination (terminating port) is also displayed. The transport addresses can thus be logged.

The GUI 400 includes a graphical display of information as a function of time. The items of information that are to be displayed can be selected by the user. In the example of FIG. 4, the information selected for display includes the PSQM score, the jitter in milliseconds, the bit rate in kilo-bits per second, and the amplitudes of the reference signal sent and the reference signal received. This information is presented as a function of time. Other types of information can also introduced by configuring the GUI 400 differently. For example, although not shown as an option in the example of FIG. 4, information pertaining to the codec type and properties or to the jitter buffer depth can be included in the graphical display.

The different items of information can be rendered using different colors. Color changes can also be used to make events more evident. The clarity of the graphical display is enhanced through the use of two vertical axes. Relatively rare events such as encoder or bit rate changes can be incorporated into the graphical display using a vertical line that is annotated to indicate what has changed, also enhancing the clarity of the graphical display.

The GUI 400 also includes a tabulation of certain data and information, such as average PSQM, maximum PSQM, and threshold values, as well other information. Raw data such as total bytes or packets transmitted or received can also be included in GUI 400.

The information is provided to GUI 400 in the following manner. The reference signal sent and reference signal received are either processed in real time or stored for post-processing. Processing of these signals includes a comparison of the reference signal sent to the signal that is received. The processing results can be buffered until they are requested for GUI 400, or provided in real time to GUI 400. Network performance information is similarly treated. Raw network performance information can be provided to GUI 400 in real time or buffered for later use. Network performance statistics derived from the raw data can be computed in real time or during post-processing. The statistics can be buffered until they are requested for GUI 400, or provided in real time to GUI 400.

As noted above, the comparison and monitoring information are correlated using time stamps. In one embodiment, the reference signal sent and the reference signal received sample interval is 0.125 milliseconds, but PSQM calculations are based on frames of 128 samples. In this embodiment, to limit the amount of information recorded, the sent and received information is reduced to the short-term average of 128 samples, increasing the sample interval to 16 milliseconds. In one embodiment, the monitoring (e.g., event) information has a frame interval of 20 or 30 milliseconds, depending on the type of encoder in use. A frame interval of 20 milliseconds represents 160 samples, and a frame interval of 30 milliseconds represents 240 samples. If the difference in rates between the PSQM calculations and the network events is not addressed, graphs of network events will overlap graphs of sent, received and comparison results. The solution involves establishing rules that dictate when and when not to mark certain points in the graphical display. Thus, the graphical display of GUI 400 incorporates the monitoring (event) information on the same time base as the reference signal information.

In summary, the present invention, in various embodiments, provides methods and devices that enable results from end-to-end voice quality testing to be correlated with network performance monitoring results. Real time measurements of events such as packet loss and jitter, plus statistics derived from these measurements, are combined in a user-friendly graphical user interface with objective measurements of properties like quality and clarity. This heretofore unavailable combination of information allows full analysis of a packet-switched network. Available in a single display is a single report of voice quality versus network performance. Thus, for example, a symptom such as poor voice clarity can be more readily matched to a probable cause, such as large packet loss.

Various embodiments of the present invention are thus described. While the present invention has been described in particular embodiments, it should be appreciated that the present invention should not be construed as limited by such embodiments, but rather construed according to the following claims.

What is claimed is:

1. A method of evaluating audio quality of a network, said method comprising:
    comparing first and second audio samples, said first audio sample comprising a reference signal transmitted through a path on said network and said second audio sample comprising said reference signal after the reference signal has traveled said path;
    monitoring network performance while said reference signal travels said path;
    correlating results of said comparing with network performance information obtained from said monitoring; and
    presenting to a user via a graphical user interface, as a function of time, the correlated results and network performance information, thereby enabling a user to better evaluate a cause of degradation in the audio quality of the network.

2. The method of claim 1 wherein said comparing uses a technique selected from the group consisting of Perceptual Speech Quality Measurement (PSQM), Perceptual Analysis/Measurement System (PAMS), and Perceptual Evaluation of Speech Quality (PESQ).

3. The method of claim 1 wherein said network performance information is selected from the group consisting of lost packet events, early arrival packet events, late arrival packet events, jitter statistics, vocoder change events, codec change events, silence packet events, and jitter buffer depth.

4. The method of claim 1 wherein said network performance information is collected using a protocol selected from the group consisting of Real-Time Transport Protocol (RTP) and Real-Time Control Protocol (RTCP).

5. The method of claim 1 wherein said correlating is performed in real-time.

6. The method of claim 1 wherein information for said comparing and from said monitoring is recorded and post-processed.

7. A device comprising:
    a memory; and
    a processor coupled to said memory, said processor for executing a method of evaluating audio quality of a network, said method comprising:
    receiving results of a comparison between first and second audio samples, said first audio sample comprising a reference signal transmitted through a path on said network and said second audio sample comprising said reference signal received after traveling said path;
    receiving network performance statistics collected while said reference signal traveled said path;
    correlating said results of said comparison with said network performance statistics; and
    causing the correlated results and network performance statistics to be presented to a user as a function of time, via a graphical user interface, thereby enabling a user to better evaluate a cause of degradation in the audio quality of the network.

8. The device of claim 7 wherein said comparison uses a technique selected from the group consisting of Perceptual Speech Quality Measurement (PSQM), Perceptual Analysis/Measurement System (PAMS), and Perceptual Evaluation of Speech Quality (PESQ).

9. The device of claim 7 wherein said network performance statistics are selected from the group consisting of lost packet events, early arrival packet events, late arrival packet events, jitter statistics, vocoder change events, codec change events, silence packet events, and jitter buffer depth.

10. The device of claim 7 wherein said network performance statistics are collected using a protocol selected from the group consisting of Real-Time Transport Protocol (RTP) and Real-Time Control Protocol (RTCP).

11. The device of claim 7 wherein said method further comprises:
    performing said comparison between said first and second audio samples.

12. The device of claim 7 wherein said method further comprises:
    monitoring said network to collect said network performance statistics.

13. A computer-usable medium having computer-readable program code embodied therein for causing a computer system to perform a method of assessing audio quality of a network, said method comprising:
    performing a comparison of first and second audio samples, said first audio sample comprising a reference signal transmitted through a path on said network and said second audio sample comprising said reference signal after the reference signal has traversed said path;
    receiving network performance statistics collected while said reference signal traversed said path;
    correlating results of said comparison to said network performance statistics; and
    presenting to a user via a graphical user interface, as a function of time, the correlated results and network performance statistics, thereby enabling a user to better evaluate a cause of degradation in the audio quality of the network.

14. The computer-usable medium of claim 13 wherein said comparison uses a technique selected from the group consisting of Perceptual Speech Quality Measurement (PSQM), Perceptual Analysis/Measurement System (PAMS), and Perceptual Evaluation of Speech Quality (PESQ).

15. The computer-usable medium of claim 13 wherein said network performance statistics are selected from the group consisting of lost packet events, early arrival packet events, late arrival packet events, jitter statistics, vocoder change events, codec change events, silence packet events, and jitter buffer depth.

16. The computer-usable medium of claim 13 wherein said network performance statistics are collected using a protocol selected from the group consisting of Real-Time Transport Protocol (RTP) and Real-Time Control Protocol (RTCP).

* * * * *

UNITED STATES PATENT AND TRADEMARK OFFICE
CERTIFICATE OF CORRECTION

PATENT NO. : 7,408,884 B2
APPLICATION NO. : 10/401010
DATED : August 5, 2008
INVENTOR(S) : Bauer et al.

It is certified that error appears in the above-identified patent and that said Letters Patent is hereby corrected as shown below:

In column 7, line 43, in Claim 2, delete "(PESO)." and insert -- (PESQ). --, therefor.

Signed and Sealed this

Twenty-first Day of October, 2008

JON W. DUDAS
*Director of the United States Patent and Trademark Office*